United States Patent [19]
Kimura et al.

[11] Patent Number: 5,287,020
[45] Date of Patent: * Feb. 15, 1994

[54] INTERFACE DEVICE PROVIDING DESIRED TIMING RELATION BETWEEN TWO SIGNALS

[75] Inventors: Shigeki Kimura, Settsu; Hiroshi Kishi, Amagasaki; Kouichi Shibata, Osaka, all of Japan

[73] Assignee: Mita Industrial Co. Ltd., Osaka, Japan

[*] Notice: The portion of the term of this patent subsequent to Jul. 15, 2006 has been disclaimed.

[21] Appl. No.: 77,795

[22] Filed: Jul. 27, 1987

[30] Foreign Application Priority Data

Jul. 28, 1986 [JP] Japan ................... 61-177285

[51] Int. Cl.⁵ ................ G01R 19/145; H03K 5/13
[52] U.S. Cl. .................... 307/518; 307/269; 307/243; 307/247.1; 328/63; 328/72; 395/101
[58] Field of Search ............ 307/269, 518, 243, 247.1; 328/63, 72, 104, 137; 364/518, 519, 200

[56] References Cited

U.S. PATENT DOCUMENTS

| | | | |
|---|---|---|---|
| 4,290,116 | 9/1981 | Morse | 371/57 |
| 4,593,390 | 6/1986 | Hildebrand et al. | 328/104 |
| 4,630,198 | 12/1986 | I-Yuan | 364/200 |

OTHER PUBLICATIONS

Manual entitled "Model 630/630 ECS Printers/Terminals API Interface (Preliminary)," published by Diablo Systems, Inc., No. 90440-00, Rev. A., Dec. 1982, cover sheet, pp. i through ix and 1-0 through 1-7 and pp. 2-8 through 2-13 and 3-15.
"Operating Instructions", KX-P1080i, 1987, pp. 5-1 to 5-3.
"Gemini 10x, 15x User's Manual", 1983, pp. 203-206.
"Gemini 10x, 15x User's Manual", 1983, pp. 246-248.

*Primary Examiner*—Stanley D. Miller
*Assistant Examiner*—Richard Roseen
*Attorney, Agent, or Firm*—Bryan Cave

[57] ABSTRACT

A Centronics type interface comprising a switching circuit selectively outputting one of two input signals having a timing relationship such that only during the time one input signal is active, the other input signal is active according to the state of a select signal, a pulse generating circuit outputting a signal for a predetermined time from the rising edge of a signal outputted from the switching circuit, and a signal selecting circuit outputting one of the other input signals and a signal outputted from the pulse generating circuit, which can hold one input signal and the signal outputted from the signal selecting circuit in a desired timing relationship.

8 Claims, 3 Drawing Sheets

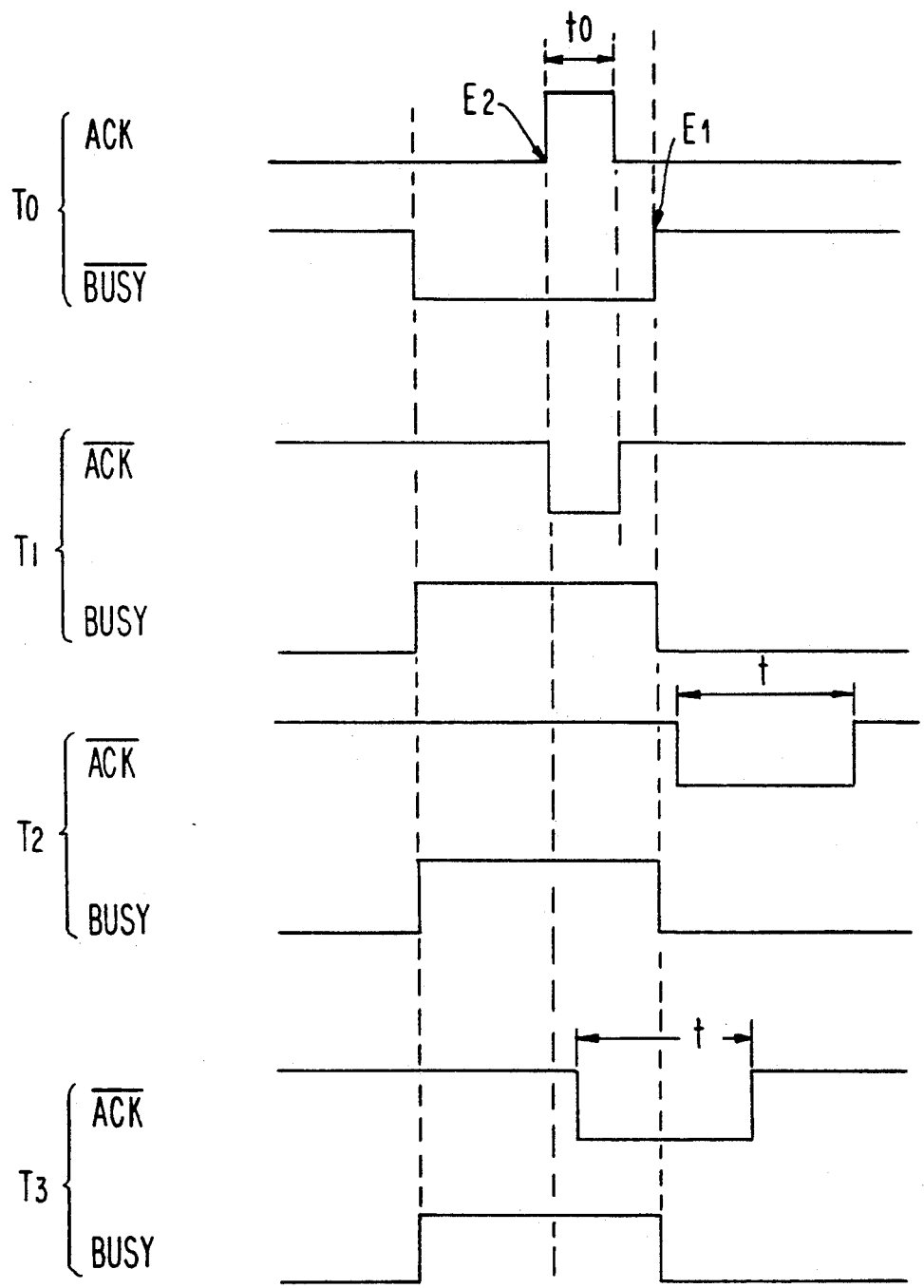

INTERFACE DEVICE PROVIDING DESIRED TIMING RELATION BETWEEN TWO SIGNALS

BACKGROUND OF THE INVENTION

The present invention relates to an interface device of the type commercially designated as the "Centronics" type. It is used, for example, in a printer or a plotter for sending and receiving data to and from external electronic equipment employing a microcomputer connected to the printer or plotter, based upon a communication system having what is commercially designated as the "Centronics Specification".

In general, the system of communicating parallel data by handshaking, which is based on the so-called Centronics specification, is well known as one specification used in communication systems between a printer or plotter and external electronic equipment employing a microcomputer. In the communication system based on the Centronics Specification, the timing relationships for each of the enabling signals $\overline{ACK}$ and BUSY, which are standards of handshaking, include three patterns as generally shown in FIGS. 3A, 3B and 3C. Normally, the Centronics type interface in one printer or plotter outputs said signals by any one of the timing patterns as shown in FIGS. 3A, 3B and 3C.

However, in case the printer or plotter performing communication by the timing relationship shown in FIG. 3B is connected to the external electronic equipment performing communication by the timing relationship shown in FIG. 3A, no handshaking can be performed because of the different timing relationships of the $\overline{ACK}$ and BUSY signals. Accordingly, the printer or plotter having the Centronics type interface cannot always communicate with the external electronic equipment using a communicating means based on the Centronics specification.

The present invention has been made in the light of the above-mentioned problems, and makes the timing relationships of the signals operate in accordance with the standards of handshaking so that the signals can be received by the external electronic equipment, provided the communicating means based on the Centronics Specification agrees with the timing relationships of the signals for handshaking outputted from the printer or plotter in case these timing relationships of the signals differ.

SUMMARY OF THE INVENTION

The present invention provides a Centronics type interface comprising switching means selectively outputting one of two input signals having a timing relationship such that only during the time one input signal is active, the other input signal is active according to the level of a select signal; pulse generating means outputting a signal for a predetermined time from the rising edge of a signal outputted from the switching means; and signal selecting means outputting one of the other input signals and a signal outputted from the pulse generating means; the one input signal and the signal outputted from the signal selecting means being held in a desired timing relationship.

Preferably, the pulse generating means is a one-shot multivibrator and the signal selecting means is a multiplexer.

In accordance with the present invention, by adding a simple circuit to a conventional Centronics type interface, a Centronics type interface is easily obtainable which can output signals for handshaking used in the communication system based on the Centronics Specification with three different timing relationships merely by changing the setting of the select signal. Accordingly, the Centronics type interface in accordance with the present invention can be economically used and reliably operated by the printer or plotter, in contrast to one which performs handshaking only by the BUSY signal.

BRIEF DESCRIPTION OF THE DRAWINGS

FIG. 2 is a timing chart showing timing relationships between an $\overline{ACK}$ signal and BUSY signal in the embodiment.

DETAILED ON OF PREFERRED EMBODIMENT

Hereinafter, a detailed description is made of an embodiment in accordance with the present invention with reference to the drawings, but the present invention is not to be limited to the embodiment as described below.

Figure 1:
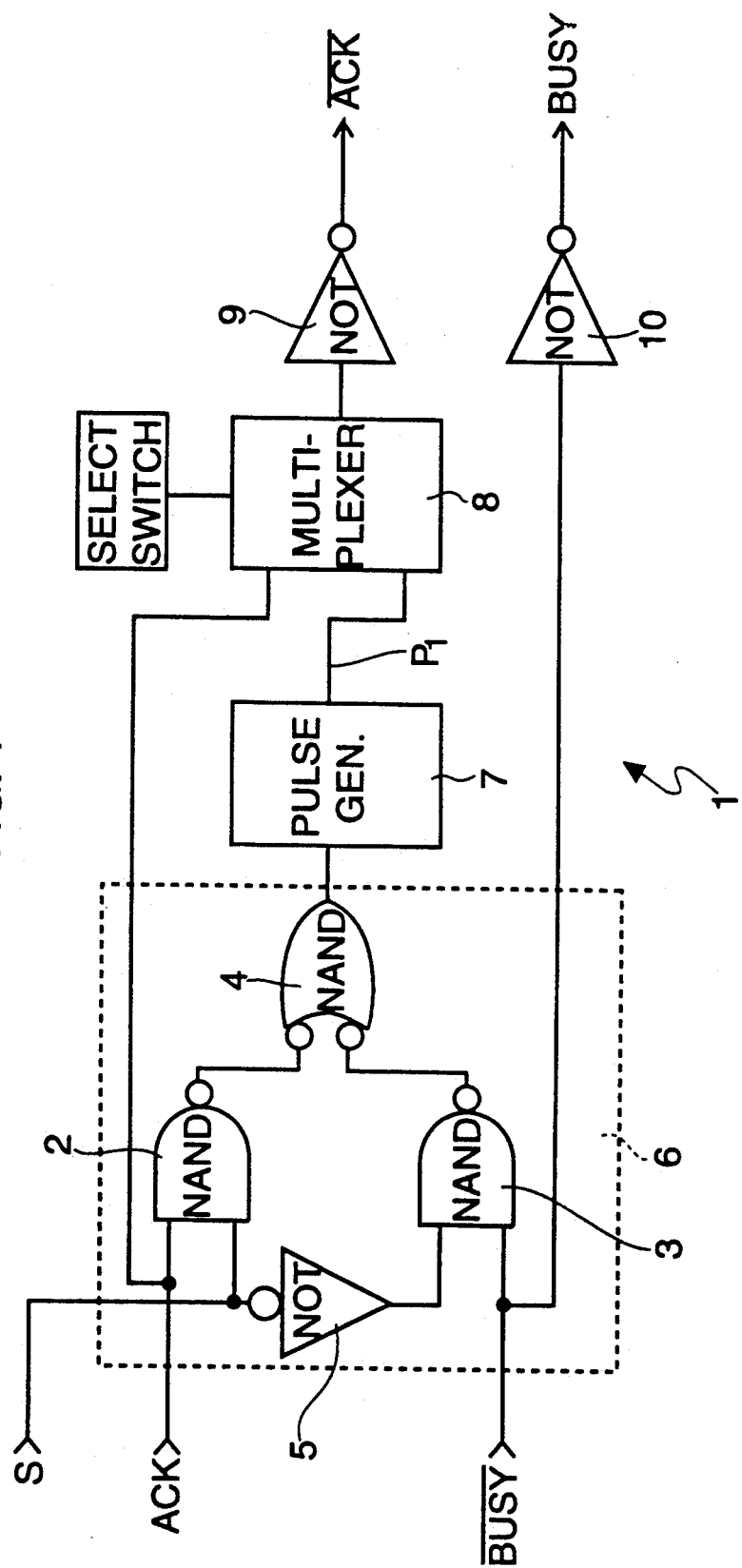
FIG. 1 is a circuit diagram of an embodiment in accordance with the present invention.
Figure 3A:
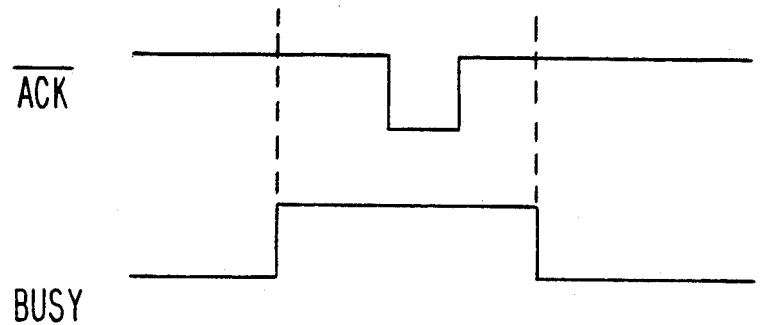
FIGS. 3A, 3B and 3C are timing charts showing timing relationships between the $\overline{ACK}$ signal and the BUSY signal in the prior art, respectively.
Figure 3B:
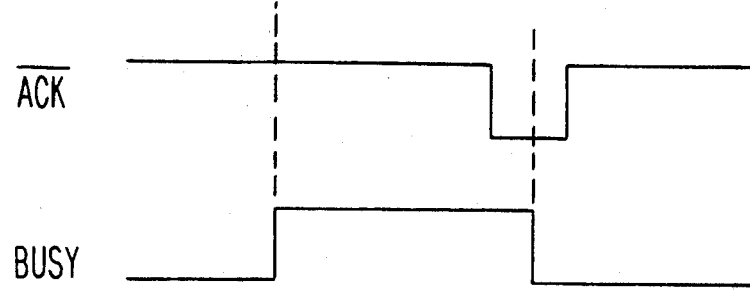
Figure 3C:
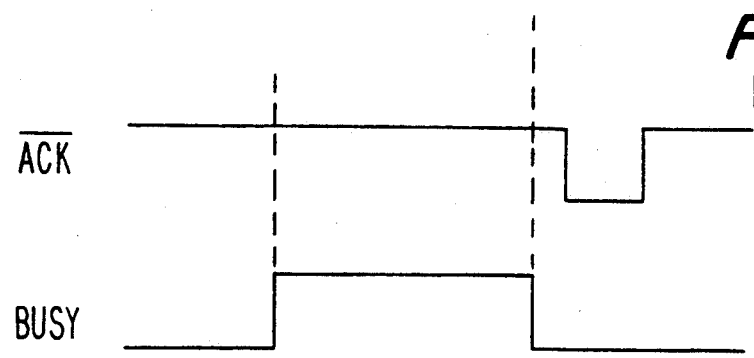

In FIG. 1, a Centronics type interface 1 comprises a switching means 6 comprising three two-input positive NAND gates 2, 3 and 4 and one NOT gate 5; a pulse generating means 7 comprising an integrated circuit (IC) of a one-shot multivibrator, for example, 74121, whose input is connected to the output of the NAND gate 4; a signal selecting means 8 comprising an IC of a two-channel multiplexer, for example, to one input of which an ACK signal is inputted and to the other input of which the output of the pulse generating means 7 is connected; a NOT gate 9 connected to the output of the signal selecting means S; and a NOT gate 10 inverting a $\overline{BUSY}$ signal, which is an input signal.

A configuration of the connection of the respective logic gates comprising the switching means 6 is described as follows.

The output of the NAND gate 2 is connected to one input of the NAND gate 4, and the output of the NAND gate 3 is connected to the other input thereof, respectively. The ACK signal, being an input signal, is inputted to one input of the NAND gate 2, and a select signal S controlling the operation of the switching means 6 is inputted to the other input thereof, which is also inputted to the input of the NOT gate S.

The output of the NOT gate 5 is connected to one input of the NAND gate 3, and the $\overline{BUSY}$ signal is inputted to the other input of the NAND gate 3.

In addition, for circuits handling signals in the Centronics Specification other than the ACK signal and the $\overline{BUSY}$ signal, which are signals for the above-mentioned handshaking, illustration and description are omitted because they are similar to the conventional ones.

Next, description is made of the operation of this embodiment with reference to FIG. 2.

In timing relationship $T_O$, as shown in FIG. 2, with the $\overline{BUSY}$ signal as one input signal and the ACK signal as the other input signal, the ACK signal is active only while the $\overline{BUSY}$ signal is active.

Now, assuming that the select signal S is "O", the switching means 6 outputs the $\overline{BUSY}$ signal, and therefore the pulse generating means 7 is triggered by a rising edge $E_1$ of the $\overline{BUSY}$ signal, outputting a pulse signal $P_1$ of a predetermined time width (pulse width) t. The pulse width t is set by a time constant of the one-shot multivibrator. When selected by the signal selecting means 8, the pulse signal $P_1$ becomes the $\overline{ACK}$ signal through the NOT gate 9. Timing relationship $T_2$ (FIG. 2) between the $\overline{ACK}$ signal and the BUSY signal in this case is such that the $\overline{ACK}$ signal is active after the BUSY signal has been inactive. That is, this means that one input signal and the signal outputted from the signal selecting means 8 is held in one desired timing relationship.

Next, in case the select signal S is "1", the switching means 6 outputs the ACK signal, and therefore the pulse generating means 7 is triggered by a rising edge $E_2$ of the ACK signal, outputting the pulse signal $P_1$. Then, when the pulse signal $P_1$ is selected by the signal selecting means 8, the pulse signal $P_1$ becomes the $\overline{ACK}$ signal through the NOT gate 9. Timing relationship $T_3$ (FIG. 2) between the $\overline{ACK}$ signal and the BUSY signal in this case is such that the BUSY signal is inactive during the period of the active $\overline{ACK}$ signal. This is another embodiment in which one input signal and the signal outputted from the signal selecting means 8 is held in another desired timing relationship different from the above desired timing relationship.

In this embodiment as described above, as can be seen in FIG. 2, the pulse width t of the pulse signal $P_1$ is larger than the pulse width $t_0$ of the ACK signal, and accordingly the timing relationship $T_3$ is obtained.

Furthermore, in case the signal selecting means 8 is set so as to select the ACK signal, timing relationship $T_1$ between the $\overline{ACK}$ signal and the BUSY signal is similar to timing relationship $T_1$ between the ACK signal and the $\overline{BUSY}$ signal, and the $\overline{ACK}$ signal is active while the BUSY signal is active. This is a further embodiment which shows that one input signal and the signal outputted from the signal selecting means 8 is held in the desired timing relationship.

As described above, the $\overline{ACK}$ signal and the BUSY signal can be held selectively in the three different timing relationships.

In the above description, the select signal S may be controlled by a microcomputer, or may be fixed in one of the above-mentioned timing relationships by setting the signal to "1" through a pull-up resistor or to the ground level ("0") by a resistor.

Also, for the signal selecting means, the same circuit as the switching means of the above-mentioned embodiment may be used, and a two-channel multiplexor may be used for the switching means.

What is claimed is:

1. An interface device of the Centronics type comprising:
    switching means selectively outputting according to a level of a select signal, one of two input signals having a timing relationship such that only during the time one input signal is active, is the other input signal active;
    pulse generating means outputting a signal for a predetermined time from the edge of a signal outputting from the switching means; and
    signal selecting means outputting the other input signal and a signal outputted from the pulse generating means;
    the one input signal and the signal outputted from the signal selecting means being held in a desired timing relationship.

2. The interface device of claim 1, wherein the switching means comprises a two-input positive NAND gate into which the other input signal and the select signal are inputted, a NOT gate inverting the select signal, a two-input positive NAND gate into which the select signal inverted by the NOT gate and the one input signal are inputted, and a two-input positive NAND gate into which output signals of the respective NAND gate are inputted.

3. The interface device of claim 1, wherein the pulse generating means is a one-shot multivibrator.

4. The interface device of claim 2, wherein the pulse generating means is a one-shot multivibrator.

5. The interface device of claim 1, wherein the signal selecting means ia multiplexor.

6. The interface device of claim 2, wherein the signal selecting means is a multiplexor.

7. The interface device of claim 3, wherein the signal selecting means is a multiplexor.

8. The interface device of claim 4, wherein the signal selecting means is a multiplexor.

* * * * *